United States Patent [19]

Fergason

[11] Patent Number: 5,572,363
[45] Date of Patent: Nov. 5, 1996

[54] RETRO-REFLECTOR BASED IN-LINE VIEWING SYSTEM

[76] Inventor: James L. Fergason, 92 Adam Way, Atherton, Calif. 94025

[21] Appl. No.: 345,656

[22] Filed: Nov. 28, 1994

[51] Int. Cl.$^6$ ................................................ G02B 27/14
[52] U.S. Cl. .......................................................... 359/630
[58] Field of Search ................................. 359/629, 630, 359/631; 345/7, 9

[56] References Cited

U.S. PATENT DOCUMENTS

| | | | |
|---|---|---|---|
| 2,883,908 | 4/1959 | Copeland . | |
| 3,200,702 | 8/1965 | Giordano | 352/61 |
| 3,447,854 | 6/1969 | Minter | 359/471 |
| 3,620,592 | 11/1971 | Freeman | 359/631 |
| 4,200,366 | 4/1980 | Freeman | 353/78 |
| 4,205,224 | 5/1980 | Mecklenborg | 250/201 |
| 4,509,837 | 4/1985 | Kassies | 353/10 |
| 4,561,722 | 12/1985 | Smetana | 350/171 |
| 4,609,253 | 9/1986 | Perisic | 350/174 |
| 4,840,455 | 6/1989 | Kempf | 350/137 |
| 5,189,452 | 2/1993 | Hodson | 353/94 |
| 5,293,271 | 3/1994 | Merritt | 359/858 |
| 5,388,276 | 2/1995 | Holmes | 2/421 |

Primary Examiner—Georgia Y. Epps
Assistant Examiner—Ricky Mack
Attorney, Agent, or Firm—Renner, Otto, Boisselle & Sklar, P.L.L.

[57] ABSTRACT

An in-line system for viewing at a viewing location in relative privacy an image provided from an image source uses a retro-reflector and a beamsplitter to provide conjugate optical path, a lens for delivering into the conjugate optical path an image from a source, and the image being enlarged by the lens and formed for as a real image relative to the retro-reflector for viewing at a comfortable viewing distance and with acceptable eye relief.

A method for presenting an enlarged, relatively private view of an image represented by light from an image source includes directing along a relatively straight path light from the image source via a beamsplitter toward a retro-reflector while enlarging the image, and reflecting light by the retro-reflector to the beamsplitter for transmission through the beamsplitter for relatively private viewing of the enlarged image at a viewing location.

9 Claims, 3 Drawing Sheets

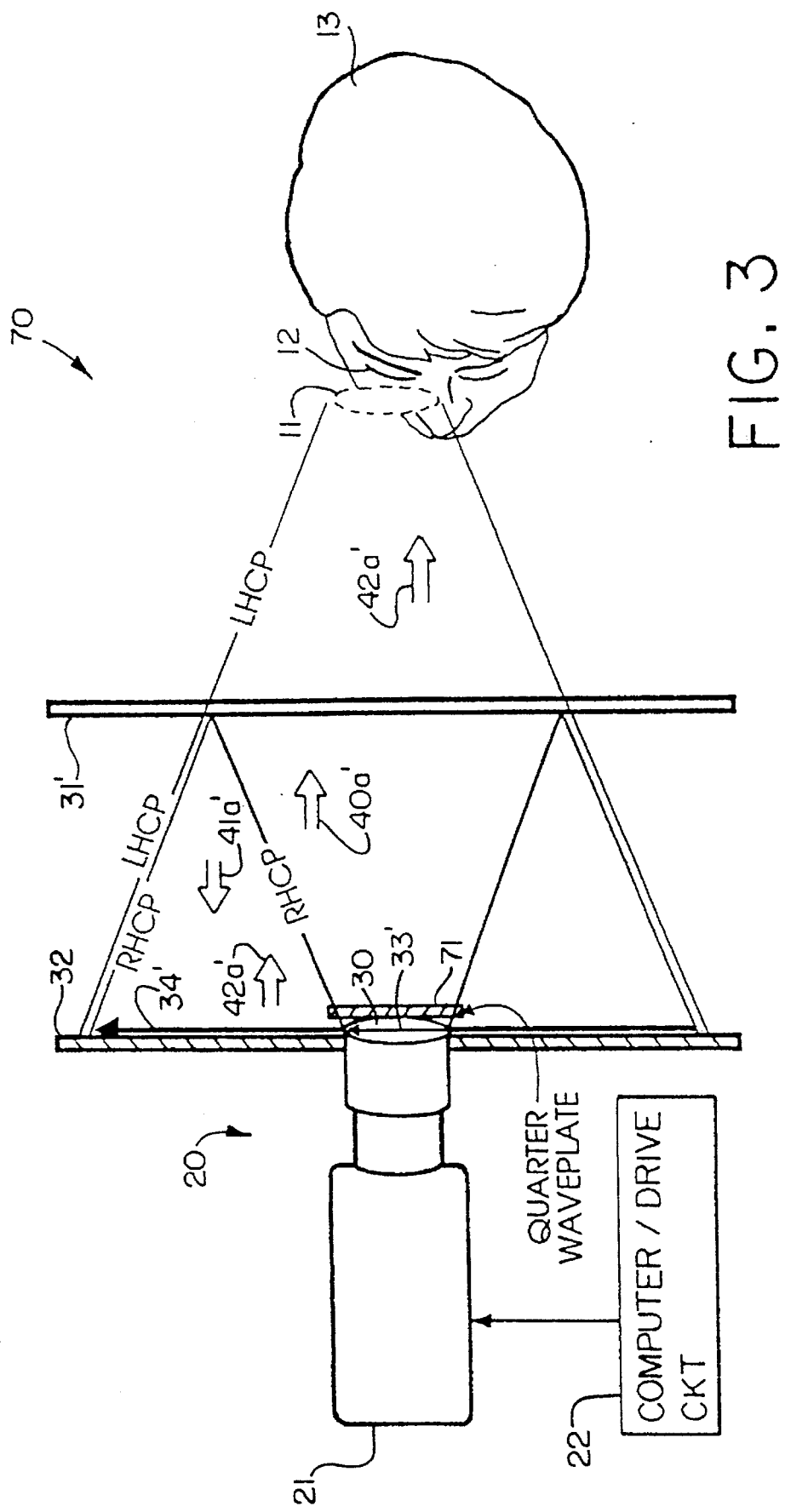

RETRO-REFLECTOR BASED IN-LINE VIEWING SYSTEM

CROSS REFERENCE TO RELATED PATENT APPLICATION

Reference is made to applicant's copending U.S. patent application Ser. No. 08/295,383, filed Aug. 24, 1994, and to concurrently filed U.S. patent application Ser. No. 08/345/657 entitled A Retro-Reflector Based Private Viewing System, the entire disclosures of which hereby are incorporated by reference.

TECHNICAL FIELD

The present invention relates generally, as is indicated, to viewing systems, more particularly, to viewing systems which use a retro-reflector, and even more particularly to an in-line viewing system and method for presenting for viewing a relatively large image that is derived from a relatively small image source. The invention also relates to the provision of privacy in viewing an image from a display, and, more particularly, to provide such privacy while presenting the image to appear like that produced from a conventional computer monitor, display etc., television and so forth. The invention also relates to methods of displaying images.

BACKGROUND

Conventional computer displays, such as cathode ray tube (CRT) displays, liquid crystal displays, electroluminescent displays, and the like present a light output representing characteristics of an image. The image may be a graphical or pictorial one, an artistic one without any particular form, an alphanumeric one (including various alphabets and/or number systems), etc. Usually the image is presented on a screen which may be flat or somewhat curved, it being appreciated that substantial effort currently is being expended in providing developments for improvements in flat displays, such as those known as flat panel displays.

Usually such conventional displays must be sufficiently large to permit the displayed image, whether graphical, alphanumeric, or other, to be viewed comfortably by a person. Exemplary displays used on portable computers usually have a diagonal dimension exceeding nine inches. Some personal organizer type computers, such as those known as a personal digital assistant, have smaller displays, but in any event the display must be sufficiently large to be read by a person. Usually the larger the display, the greater the cost. Also, the larger the display, the greater the weight.

Over the years substantial effort has been applied to expand the viewing angle for many displays, for example, off-axis viewing can be enhanced in a liquid crystal display by using optical retarders, as is disclosed in U.S. Pat. No. 4,385,806. A disadvantage when a display has a wide field of view is the lack of privacy; for example, as an individual is working on a portable computer while riding on a public vehicle, another rider may too easily observe the display. Another disadvantage is the wide distribution of light output that may occur when there is a wide angle of view provided by a display; such wide distribution may reduce the brightness, intensity and/or contrast of the display.

An effort is made herein to distinguish between field of view and angle of view (also referred to sometimes as viewing angle). A field of vie usually refers to how wide an image looks or appears to the eye or how much of a display is able to be seen at one time. The angle of view is usually refers to the angle at which one looks at or can look at an image, display, etc. For example, a narrow angle of view at which a monitor (or some other display device) must be viewed means that although the full monitor can be viewed, such viewing can be had from only a relatively small spot, or even from one spot or position. However, that monitor may present a relatively wide field of view to the viewer. As another example, in a heads up speedometer display of an automobile, the angle of view usually is relatively narrow so only the driver sees the display,; but the field of view usually is sufficiently wide to permit all of the desired information to be seen by the driver.

One prior approach to provide privacy in viewing a display has been to use a head mounted display which is supported on the head of a user (or on some other body part, for example), a helmet mounted display, etc. and provides a closed area in which the eye(s) view(s) the images provided by the display. Such displays sometimes provide increased immersion into the image whereby the user can observe the displayed images without being distracted by other visual stimuli, etc. Another technique for increasing the private viewing of a display has been to use a binocular, telescope or microscope type system through which the observer looks to see an image.

It is desirable that a display have adequate eye relief and comfort with which images can be viewed. One aspect of comfort is the distance at which the image is viewed or appears to be located relative to a viewer's eye(s); a comfortable viewing distance is about 20 inches or more, for example, approximate reading distance. This distance physically can be changed using lenses, e.g., eyeglasses, but the apparent distance of the image should be maintained at a comfortable distance, for example, twenty inches or more. An aspect of eye relief is the distance between the eye and the last optical element closest to the eye, such as the output objective of a microscope, telescope, etc. Often, it is desirable that such distance be relatively large to provide adequate eye relief. Without adequate eye relief and/or comfortable viewing distance, a person's eye(s) may be strained to view an image and/or otherwise caused discomfort.

A problem with many prior display systems is the relatively large amount of power required to operate the display. For example, a power hungry display is especially disadvantageous in a battery powered computer, in a video display used in a vehicle, such as an automobile, aircraft, watercraft, etc., where there may be a limited supply of power. It also would be desirable to reduce the power required for a display and/or the power requirements of a device, such as a computer, video display system, etc., which uses a display.

Removal or reduction of glare in or on a display is another problem for which substantial effort has been expended in the past. Glare usually is due to the reflection of ambient light from a display screen, monitor, liquid crystal display, cathode ray tube, electroluminescent display, etc. Most efforts in the past to try to reduce glare also have reduced the brightness of the image presented by the display. It would be desirable to reduce glare while minimizing the impact on the brightness of the image presented by the display. At technique for glare reduction is disclosed in the concurrently filed patent application and can be used in the instant invention, too Several other features and advantages of the present invention are summarized here. These features and advantages may be used alone and/or in combination with other features, aspects and/or advantages described herein. For example, the invention may be used to provide an enlarged and relatively private view over a relatively narrow angle of view of a relatively small display, image source, etc., while providing a relatively wide field of view. Light may be collected so that a relatively large amount is directed to the retina of a viewing eye while reducing the amount of light which is otherwise lost to the system, thus enabling the display to be relatively bright without requiring an especially bright source of light for the display, image source, etc. Also, since the viewing system may be used to enlarge the image provided by the source, a relatively small source can be used to supply the image for viewing. The smaller source can reduce power requirements, weight, etc., as is known. The light may be spread over the retina of the viewing eye and, therefore, the space between pixels (picture elements) of the image source, such as a liquid crystal display, for example, tends to be somewhat dampened thereby to reduce the distinction seen between pixels and optically inactive space in the display. Further, using the glare reducing technique hereof, glare can be reduced without significantly reducing brightness of the viewed output.

With the foregoing in mind, then, there is a need to provide the ability to view in private an image provided by a source such that the viewed image is enlarged relative to the size of the image at the source.

BRIEF SUMMARY OF THE INVENTION

According to one aspect or the invention, an in-line system for viewing at a viewing location an image provided from an image source includes a retro-reflector, a beamsplitter, and a lens; the lens and the beamsplitter being cooperative to form relative to the retro-reflector an enlarged image of the image provided from an image source, and the retro-reflector reflects light to the beamsplitter for transmission therethrough for viewing.

According to another aspect, an eyepiece includes a retro-reflector a beamsplitter, and means for expanding an image received from a source, the beamsplitter and means for expanding being cooperative to direct an expanded image to the retro-reflector, and the retro-reflector and beamsplitter being cooperative to permit viewing of the expanded image.

According to a further aspect, an in-line viewing system for viewing at a viewing location an image from an image source includes a lens for directing an image from the image source toward a the viewing location, a retro-reflector, and a beamsplitter between the lens and viewing location for reflecting light from the lens to the retro-reflector and for transmitting light from the retro-reflector to the viewing location.

According to an additional aspect, a display system includes a retro-reflector and a beamsplitter in optical series (straight line), and focusing means for enlarging an image and directing the image toward the beamsplitter for reflection by the beamsplitter toward the retro-reflector, the retro-reflector being operative to reflect light toward the beamsplitter for transmission through the beamsplitter for viewing the enlarged image from a viewing location.

According to even another aspect, a computer display system includes a computer for generating signals representing an image, a relatively small display for presenting a light output representing such image, a retro-reflector, a beamsplitter, and focusing means for focusing light from the display to expand such image, the focusing means, beamsplitter and retro-reflector being in optical series, the beamsplitter being positioned to receive from the focusing means light expanding such image and to direct such light to the retro-reflector, and the retro-reflector reflects such light along substantially the same, but opposite, direction as the light incident thereon for transmission through the beamsplitter for viewing.

According to even a further aspect, a private viewing system for viewing a display includes a retro-reflector, a beamsplitter, and a lens, the retro-reflector, beamsplitter and lens being positioned in a substantially optically straight path for presenting for viewing at a viewing location an enlarged image of the image provided by a display, the lens focuses light from a display toward the beamsplitter for reflection by the beamsplitter toward the retro-reflector while the image is enlarging, and the retro-reflector reflects light incident thereon for transmission through the beamsplitter for viewing at a viewing location.

According to even an additional aspect, a viewing apparatus includes a beamsplitter and a retro-reflector in optical series and in parallel spaced apart relation, and a lens on one side of Me beamsplitter for enlarging an image from a source and directing the light representing the image toward the beamsplitter for reflection to the retro-reflector, and the retro-reflector reflects light incident thereon toward the viewing beamsplitter for transmission to a viewing location for viewing of the enlarged image.

Still another aspect concerns a display system including a display for presenting a light output representing characteristics of an image, a lens for receiving such light output and for focusing the light to enlarge the image, a retro-reflector, and a beamsplitter, the lens, retro-reflector and beamsplitter being cooperatively related for the lens to direct light therefrom toward the beamsplitter for reflection thereby to the retro-reflector to form an enlarged image, and the retro-reflector reflects light incident thereon for transmission through the beamsplitter for viewing the enlarged image at a viewing location.

Still a further aspect concerns a method for presenting an enlarged view of an image represented by light from an image source including directing light from the image source toward a retro-reflector, the directing including expanding the light to form an enlarged image, the directing also including using a beamsplitter to reflect light from the image source toward the retro-reflector, and reflecting light by the retro-reflector to the beamsplitter for transmission through the beamsplitter for viewing of the enlarged image at a viewing location.

One or more of these and other aspects, objects, features and advantages of the present invention are accomplished using the invention described and claimed below.

To the accomplishment of the foregoing and related ends, the invention, then, comprises the features hereinafter fully described and particularly pointed out in the claims. The following description and the annexed drawings set forth in detail certain illustrative embodiments of the invention. These embodiments are indicative, however, of but a few of the various ways in which the principles of the invention may be employed.

Although the invention is shown and described with respect to certain preferred embodiments, it is obvious that equivalents and modifications will occur to others skilled in the art upon the reading and understanding of the specification. The present invention includes all such equivalents and modifications, and is limited only by the scope of the claims.

BRIEF DESCRIPTION OF THE DRAWINGS

In the annexed drawings:

FIG. 3 is an alternate embodiment of viewing system using a cholesteric liquid crystal beamsplitter device.

DESCRIPTION

Figure 1:
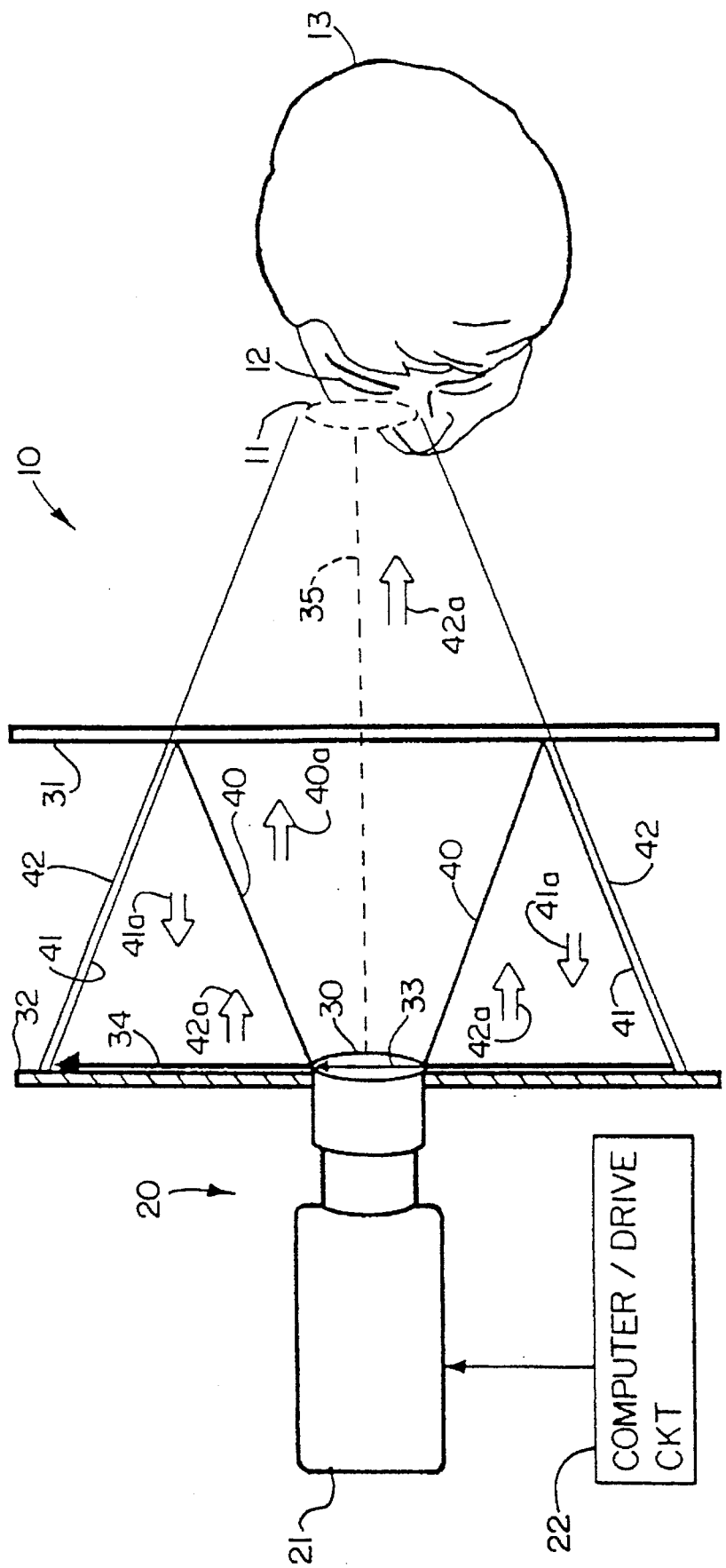
FIG. 1 is a schematic illustration of a retro-reflector based viewing system in accordance with the present invention providing an image to one eye of a viewer.

Referring to the drawings in which like reference numerals designate like parts in the several figures, and initially the FIG. 1, a viewing system in accordance with the present invention is shown at 10. In a sense, the viewing system 10 may be considered an eye piece for viewing an image produced by a source. The source may be a display which creates an image for viewing, either by controlling transmission or reflection of light, by providing a light output or by modulating light, may be a view of a real life scene, etc.

The viewing system presents at a viewing location 11 an image for viewing by an eye 12 of a viewer 13, such as a person, other animate or inanimate object, machine, etc. The image presented at the viewing location 11 may be of a size such that it is seen ordinarily by a single eye 12 or it may be of a size as to be seen simultaneously by both eyes of the viewer.

An image source 20 provides an image input to the viewing system 10. The image source (sometimes simply referred to as source) may include, for example, a liquid crystal display (LCD), cathode ray tube display (CRT), electroluminescent display, computer monitor, television, etc., which is generally indicated at 21. The display 21 may be a miniature image source, such as one conventionally available as a twisted nematic liquid crystal display. One example is that sold by SONY Corporation under designation XCM07, which has a diagonal dimension of approximately 0.7 inch. Also, it will be appreciated that the invention is useful with virtually any type of image source or display source. An example of such a display source is a compact flat panel display, and especially one utilizing a reflective liquid crystal display made from a single crystal silicon active matrix array. An example of such image source is disclosed in copending, commonly owned U.S. patent application Ser. No. 08/275,907, filed Jul. 5, 1994, the entire disclosure of which hereby is incorporated by reference.

The image source 20 also may include a computer or other drive circuitry, such as that circuitry used conventionally in a television, in a computer video card, etc., generally designated 22, for developing electrical signals to operate the display device 21.

An exemplary display 21 may be one proposed by SONY Corporation in a paper presented at the Society for Information Display, International Display Research Conference, Oct. 10–13, 1994, Monterey, Cal., entitled "A 1.35- in.-diagonal Wide-Aspect-Ratio Poly-Si TFT LCD with 513k pixels", at pages 4144–417 of the conference record. Other types of liquid crystal displays or other display devices may be used in and/or with the invention.

The viewing system 10 includes focusing optics 30, beamsplitter 31, and retro-reflector 32. The focusing optics 30 may be a single lens or a combination of lenses. Alternatively, the focusing optics 30 may be some other device that is able to focus light in the manner described further below. In particular, desirably the focusing optics 30, which will be referred to hereinafter as a lens is intended to receive from the image source 20 light representing or having characteristics of an image, such as pictorial, graphical and/or alphanumeric information or images, and to project light toward the beamsplitter while expanding the light or image to present an enlarged image. As is seen in FIG. 1, the image 33 directly at the output of the lens 30 is a vertically pointing arrow, and the enlarged image of the vertically pointing arrow is shown at 34. The focusing optics may include other components, such as lenses, reflectors, prisms, filters, polarizers, wave plates, apertures, stops, etc.

The beamsplitter 31 may be, for example, a sheet of glass or some other material that is able to reflect some of the light which is incident thereon and is able to transmit some of the light that is incident thereon. The ratio of the amount of light reflected and transmitted may vary. For example, that ratio may be approximately 50 percent, i.e., evenly divided so that about half the light incident on the beamsplitter is reflected by it, and half is transmitted by it. The beamsplitter 31 may be flat, planar, and arranged in such a way that the plane thereof is parallel with the major planar extent of the lens 30. However, if desired, the beamsplitter may be oriented in a different relation to the lens 30.

The retro-reflector 32 may be, for example, a screen or sheet of retro-reflecting material. A retro-reflector is a device which reflects light substantially in the same, but opposite, direction as the direction that the light is incident on the retro-reflector. One example of retro-reflector is a corner reflector or a sheet having a plurality of corner reflectors. Another example of retro-reflector is a material having plural glass beads or other refracting and/or reflecting devices on or in a support. The resolution of a retro-reflector may be a function of, for example, the number of corner reflectors per unit area, the number and/or size of beads per unit area, etc. Usually the better or greater the resolution or quality of a retro-reflector usually the larger the number of corner reflectors, for example, per unit area.

Various retro-reflectors are well known in the art. An example of a retro-reflector is a film or sheet material having a plurality of corner cubes which material is sold by Reflexite Corporation of New Britain, Conn. Such material is available having about 47,000 corner reflectors per square inch. Usually, the larger the number of corner reflectors per unit area, the better will be the resolution and overall optical output quality provided by the viewing system 10. However, retro-reflector material having better or worse resolution than that provided by the mentioned retro-reflector material may be used in accordance with the principles of the present invention.

The viewing system 10 provides an in-line arrangement of parts and viewing function. For example, the lens 30, beamsplitter 31, and retro-reflector 32 are arranged in optical series, preferably effectively in a straight line relative to each other and in a straight line relative to the viewing location 11. In this regard, preferably the beamsplitter 31, retro-reflector 32, and major planar extent of the lens 30 are parallel to each other and perpendicular to the optical axis 35 of the viewing system 10 along which the viewer 13 looks to see the image 34.

An advantage of the in-line arrangement of parts illustrated and described in the viewing system 10, is the operation to provide viewing of the image essentially in the same way that an image of a conventional computer display, television monitor, etc., is viewed by a viewer. However, it will be appreciated that the various parts of the viewing system 10 may be oriented in other ways relative to each other to accomplish the same result as that described herein. For example, it has been found that the retro-reflector may be other than a flat sheet of material, such as, for example, two sheets of flat material that are arranged at other than a parallel coplanar relationship to each other. Alternatively, the retro-reflector 32 may be curved. Furthermore, if desired, means may be provided in the viewing system 10 to fold the optical paths followed therein, ultimately, though, providing the output at the viewing location 11.

In operation of the viewing system 10, the image source 20 provides to the lens 30 light having characteristics of an image, such as the arrow image 33. The lens 30 projects the light toward the beamsplitter 31. The projected light 40*a* is shown bounded by a cone angle represented by lines 40 from the lens 30 to the beamsplitter 31. As is seen in FIG. 1, the cone 40 is expanding and, therefore, the light expands and, in particular, the image 33 is enlarged.

The beamsplitter 31 reflects at least some of the light incident thereon from the lens 30 as light 41 *a* toward the retro-reflector 32 within a cone or solid angle bounded by lines 41. The lens 30 and beamsplitter 31 cooperate to form the enlarged image 34 as a real image. In one embodiment the enlarged image 34 is formed at the retro-reflector 34. If desired, the enlarged image 34 can be formed or in focus at a location in front of (to the right in FIG. 1 ) or behind (to the left in FIG. 1) the retro-reflector 32. Light incident on the retro-reflector 32 within the boundaries of the cone 41 is reflected as light 42*a* back toward the beamsplitter 31 within the boundary of a cone represented by lines 42. Actually, lines 41 and 42 may be conjugate with each other, e.g., in the same but opposite direction, and the respective light rays constituting light 41*a*, 42*a* may be conjugate, the degree conjugate being a function of the resolution of the retro-reflector, for example. However, in FIG. 1, the lines 41, 42 are shown slightly spaced apart to distinguish between the lines and the cones (or solid angles) of light bounded thereby.

At least some of the light 42*a* within the cone 42 that is reflected by the retro-reflector 32 toward the beamsplitter 31 is transmitted through the beamsplitter 31 toward the viewing location 11.

It will be appreciated that the lens 30, beamsplitter 31 and retro-reflector 32 cooperate to allow the enlarged image 34 to be viewed at the viewing location 11. Also, it will be appreciated that the viewing location 11 in essence is arranged so as to be the opposite counterpart to the lens 30 in that the viewing system 10 causes the viewing location 11 to be functionally and optically at a location in relation to the image produced by the image source 20, essentially the same as the relation of the lens 30 to the image display 21 or the provided by the image source 20. However, at the viewing location 11 the eye 12 is able to see the enlarged image 34. Therefore, although the image source 20 may be a relatively small image source, such as the 1.3 inch diagonal display by SONY Corporation mentioned above, the actual size of the enlarged image 34 seen by the eye 12 at the viewing location 11 is significantly larger and is able to be easily read, viewed, etc.

Light 40a projected by the lens 30 within the cone 40 toward the beamsplitter 31 is reflected as light 41*a* toward the retro-reflector 32 to form the enlarged image 34. The light 42*a* which is reflected by the retro-reflector 32 passes through the beamsplitter 31 and on to the viewing location 11.

As is characteristic of a retro-reflector, the light 41*a* incident on the retro-reflector 32 is reflected by the retro-reflector as light 42*a* such that the path of respective incident and reflected light rays is conjugate, i.e., the same, but in opposite directions. Therefore, light reflected by the retro-reflector 32 and transmitted by the beamsplitter 31 is brought to the viewing location 11 such that the viewing location 11 essentially is the same size and configuration as the lens 30. By placing the lens of the eye 12 at the viewing location 11, the light is focused on the retina of the eye forming an image seen by the viewer 13. Also, since the viewing locution is relatively precise, privacy of viewing is provided and to some degree immersion in the image or concentration on the image may be enhanced relative to conventional displays.

Thus, the retro-reflector 32 is part of a conjugate optics path in which light incident thereon is reflected in the same path and opposite direction as the incident light. The beamsplitter reflects light from the lens 30 to the retro-reflector 32 and transmits the reflected light from the retro-reflector to the viewing location 11 for viewing by the eye 12. The beamsplitter 31 and retro-reflector 32 cooperate as a conjugate optics system to provide the conjugate optics path described.

Advantageously, using the described conjugate optics path and system, relatively minimal amount of light from the image source 20 is lost, and, conversely, relatively maximum amount of light is directed to the eye 12. It is to be appreciated that there may be some loss of light due to absorption in the various components of the system, inefficiencies in those components, and transmission by the beamsplitter 31 of some of the light incident thereon from the lens 30 and reflection by the beamsplitter 31 of some of the light reflected thereto by the retro-reflector 32. It also will be appreciated that there is substantial accuracy of image and image resolution conveyed to the eye 12, for example, since the number of elements in the viewing system 10 is relatively minimal, image distortion is minimized. Furthermore, especially if a relatively good quality, high resolution retro-reflector is used so that the precise location at which the enlarged image 34 is in focus will not be critical, e.g., it can be behind or in front of the retro-reflector, there is a reduced tolerance required for the relative positioning of the components of the viewing system 10, thus making the viewing system relatively robust and reliable.

The actual position of the viewing location 11 relative to the lens 30 and image source 20 ordinarily will depend on the focal length of the lens 30. Since the viewing location 11 can be located relatively remotely from the lens 30 and image source 20, for example, at a distance of 20 inches or more, which is quite typical when a computer screen is viewed, for example, the lens 30 may have a relatively long focal length with the advantages attendant such a lens. An example is a 50 mm focal length lens mentioned above; but the focal length may be greater or less than 50 mm. Long focal length gives very good/long eye relief. Long focal length also allows the head box to be larger than in conventional head (or helmet) mounted displays, for example. Further, a longer focal length lens compared to that used in head (helmet) mounted displays can provide a larger sweet spot for viewing the image, and such a lens can provide a relative narrow angle of view for privacy of viewing. The narrow angle of view can be limited easily to the area of the respective retro-reflectors, for example, to allow the entire image on the retro-reflector(s) to be viewed. The ability to view the entire image at the retro-reflector(s) also produces a relatively wide field of view to view all information on the retro-reflector(s), and this is further enhanced or all the more so by the effective placement of the viewer's eye at the lens 30 relative to the image source as is described else where herein.

Since the viewing location 11 is relatively precise and since the conjugate optics path in the viewing system 10 tends to avoid directing light outside the various optical paths shown in FIG. 1, for example, the image created by the image source 20 can be viewed by the viewer 13 with relative privacy and without disturbing others. Moreover, since the display 21 of the image source 20 may be rather small, the power required to operate that image source can be correspondingly small. In fact, the invention has been found useful to present an enlarged image 34 that has a diagonal dimension of approximately 9 inches using the above-mentioned 0.7 inch image source; such image source has been operated successfully in a viewing system 10 to present the large image mentioned while requiring relatively low power, for example, on the order of less than about 3 watts.

Considering the brightness of the image seen by the viewer 13, the light produced by the image source 20 may be polarized or unpolarized. The beamsplitter 31 may be a non-polarizing type or a polarizing type. If the beamsplitter 31 is a non-polarizing type, then a balanced situation is to have 50 percent of the light incident on the beamsplitter reflected and 50 percent transmitted. Thus, of the light 40a incident on the beamsplitter 31 from the lens 30, 50 percent is reflected and sent toward the retro-reflector 32 as light 41a. Of the reflected light 42a from the retro-reflector 32, 50 percent of the light will be transmitted through the beamsplitter 31 and will travel to the viewer's eye 12. This configuration of components in the viewing system 10 can transfer to the viewer's eye a maximum of about 25 percent of the light produced by the image source 20. However, if desired, the beamsplitter 31 can be modified in ways that are well known to change the ratio of the reflected light to the transmitted light thereby. Also, the beamsplitter 31 may include an anti-reflection coating so that all or an increased amount of the image comes from one side of the beamsplitter, thereby reducing the likelihood of a double image.

Figure 2:
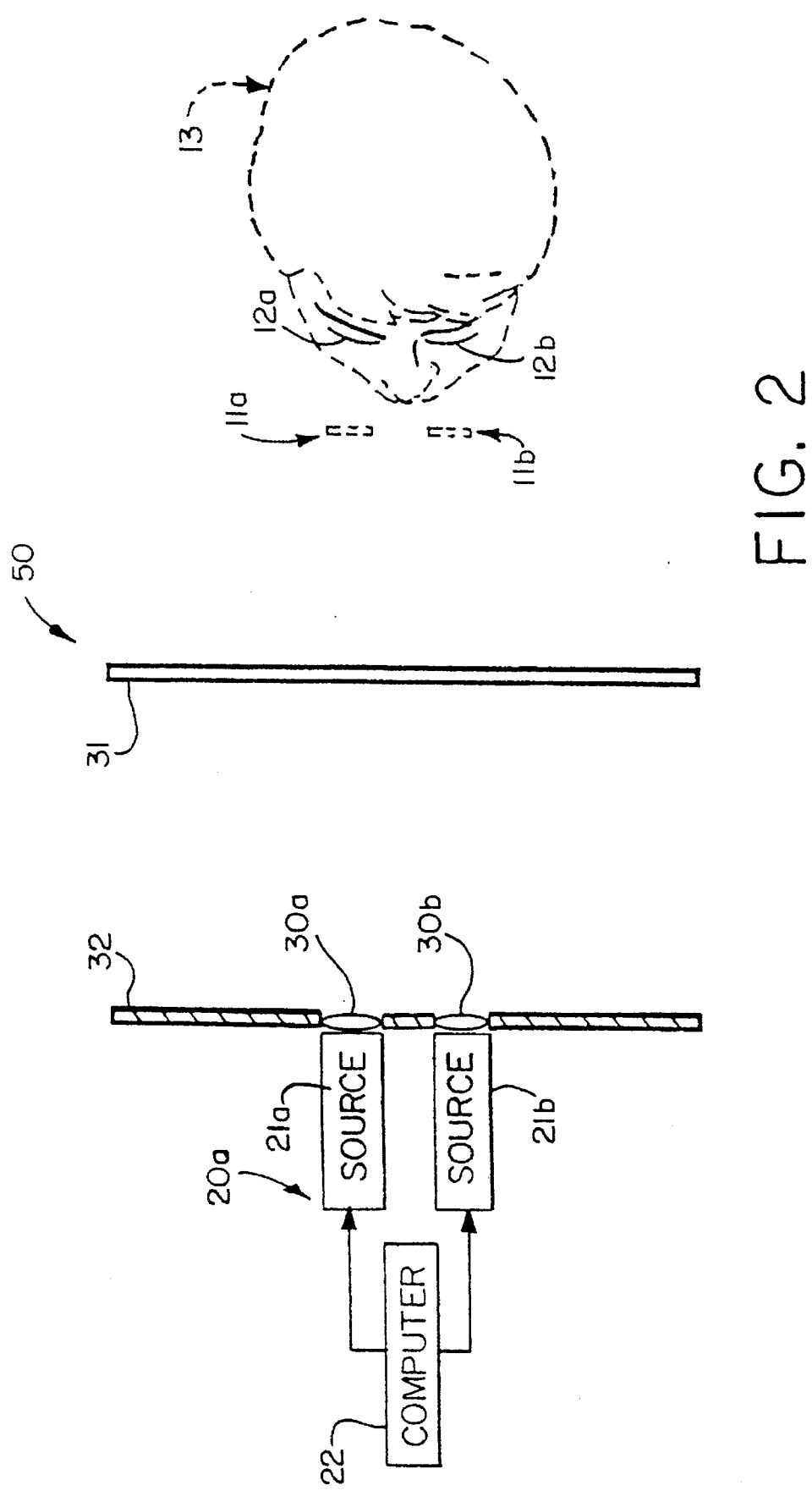
FIG. 2 is a schematic illustration of a viewing system similar to that shown in FIG. 1, but providing separate images to the two eyes of a viewer.

Turning to FIG. 2, an alternate viewing system 50 is shown. The viewing system 50 is similar to the viewing system 10 described above and illustrated in FIG. 1 except that the viewing system 50 includes a modified image source 20a, which has a pair of displays 21a, 21b respectively operated by the computer or drive circuit 22. The viewing system 50 includes a beamsplitter 31 and a retro-reflector 32, as were described above. The viewing system 50 also includes a pair of focusing optics or lenses 30a, 30b, which are respectively associated with displays 21a, 21b in the same manner that the lens 30 is associated with the display 21 of FIG. 1.

Operation of the viewing system 50 provides respective images at respective viewing locations 11a, 11b for viewing by the respective eyes 12a, 12b of a viewer 13. Thus, display 21a in cooperation with the lens 30a, beamsplitter 31 and retro-reflector 32 provides an image at viewing location 11a for viewing by the eye 12a in the same way that the various components of the viewing system 10 provided an image at the viewing location 11 for the eye 12, as is illustrated in FIG. 1. Similarly, the display 21b in association with the lens 30b, beamsplitter 31 and retro-reflector 32 provides an image at the viewing location 11b for viewing by the eye 12b. Due to the conjugate paths along which the retro-reflector 32 reflects light, the light from the displays 21a, 21b will not mix or interfere with each other.

Using the viewing system 50, it will be appreciated that the image provided the viewer 13 may be a two dimensional one or a three dimensional stereoscopic image. The three dimensional stereoscopic image can be provided by presenting the eyes 12a, 12b respective right eye and left eye images derived from the respective displays 21a, 21b under control of the computer 22 in the image source 20a. The providing of left and right eye images to the respective eyes of a viewer is conventional; the apparatus and method of the invention for providing those images is not conventional.

It will be appreciated that the viewing system 10 is able to take an optical input, such as an image, from a relatively physically small screen, display, etc., and can relay the image to a viewer's eye in a way that the resulting image is large and is placed at a comfortable viewing distance of, for example, about 20 inches. The viewing system of the invention also provides good eye relief because usually it is unnecessary to have any optical element in close proximity to the viewer's eyes. However, if desired, the viewer may wear eyeglasses (lenses) that will cooperate with the viewing system to provide an image easily viewed at the viewing location 11 for focusing on the retina of the eye. Use of eyeglasses, though, will not usually detrimentally affect the eye relief of the invention, as most people are accustomed to wear either corrective lens eyeglasses or sunglasses.

The viewing systems 10 and 50, which are illustrated in FIGS. 1 and 2, for example, show all of the components "in line", i.e., most preferably in a straight line without any bends. This feature is desirable, especially compared to "off axis" optical systems used in some head mounted display systems, for example. Off axis systems are more complex, usually require additional parts and more accurate positioning of them, and often are more difficult to fabricate and to assemble while maintaining the required more accurate tolerances. Thus, the present invention is less complex, is easier to manufacture, and generally is more robust than many off axis optical systems.

In FIG. 3 an alternate viewing system 70 is shown. The various components of the viewing system 70 are the same or analogous to those components used in the viewing system 1 and the viewing system 50 described above with the exceptions noted below. The viewing system 70 provides to a viewing location 11 for viewing by the eye 12 of a viewer 13 an image from an image source 20, which includes a liquid crystal display 21 and a computer or other drive circuit 22. The display 21 may be other than a liquid crystal display. However, as will be evident from the description below, desirably the light output by the display 21 has characteristics of optical polarization. Those characteristics may be plane polarization or circular polarization.

In the illustrated embodiment of viewing system 70, the display 21 is a liquid crystal display and the light output from it is plane polarized. Thus, the image 33' output from the lens 30 is plane polarized. A wave plate, optical retarder, etc., for example, a quarter wave plate, designated 71 is positioned relative to the display 21 and/or the lens 30 to convert the light from plane polarized to circularly polarized. Accordingly, the appropriate axis of the quarter wave plate 71 preferably is oriented at or approximately at 45 degrees relative to the axis of polarized light which forms the image 33'. If desired, the wave plate 71 may be positioned optically upstream of the lens 30 and/or other focusing optics. Thus, the light 40a' is circularly polarized. In the illustrated example light 40a' is right hand circularly polarized.

The viewing system 70 also includes a beamsplitter 31' and a retro-reflector 32. The retro-reflector 32 may be the same as the retro-reflector 32 described above. However, the beamsplitter 31' preferably is a cholesteric beamsplitter. A cholesteric beamsplitter may be made of liquid crystal material, especially of cholesteric liquid crystal material, which is operative to reflect circularly polarized light of one handedness and to transmit circularly polarized light of the other handedness. Such beamsplitters are known. In the illustrated embodiment of viewing system 10, the beamsplitter 31' reflects right hand circularly polarized light toward the retro-reflector 32. The retro-reflector 32 reflects such light, and in so doing it converts the reflected light to left hand circularly polarized light.

The left hand circularly polarized light is directed by the retro-reflector 32 along a conjugate optical path, as was described above with reference to FIG. 1, for example, back to the beamsplitter 31'. Since the light is left hand circularly polarized, such light is transmitted by the beamsplitter 31' as light 42a' for delivery to the viewing location 11 and viewing by the eye 12.

The beamsplitter 31' in the viewing system 70, therefore, may be designed only to transmit light which is left hand circularly polarized and only to reflect light that is right hand circularly polarized. Therefore, the right-hand circularly polarized light from the image source 20, focusing optics 30 and quarter wave plate 71 does not have any waste or has reduced waste by transmission through the beamsplitter 31' without being reflected to the retro-reflector 32. Similarly, the left hand circularly polarized light from the retro-reflector 32 transmits through the beamsplitter 31' and is not wasted or has reduced waste by reflection from the beamsplitter 31' back toward the image source 20.

In the viewing system 10 of FIG. 1 it is possible for the viewer 13 to look directly through the beamsplitter 10 and to see the image 33 and other light from the lens 30. An advantage to the viewing systems 70 of FIG. 3 is that the image 33', wave plate 71, and lens 30 are not directly viewable by the viewer 13 since the beamsplitter 31' blocks the right hand circularly polarized light 40a' and only reflects it.

A cholesteric beamsplitter usually is wave length dependant. Therefore, a cholesteric beamsplitter that is operable in the manner described above for one wave length may transmit all light of a different wave length. In the viewing system 70 described above, when the display 21 is a monochromatic display or in any event it produces a light output that is able to be selectively transmitted or reflected by the beamsplitter 31' as a function of the direction of circularly polarization, a single beamsplitter is satisfactorily useful in the manner described above. However, if a multi-color display is desired for the viewing system 70, for example, including red, green and blue light components produced by the image source 20, then the beamsplitter 31' can be replaced by three beamsplitters arranged in optical series. One of those beamsplitters would be useful in the manner described above to reflect or to transmit selectively light of one wave length, depending on the direction of the circular polarization of that light. The other two cholesteric beamsplitters would function similarly but for other respective colors. In this way the full color spectrum of light or color output can be produced and viewed using the viewing system 70.

STATEMENT OF INDUSTRIAL APPLICATION

In view of the foregoing it will be appreciated that the invention may be used in viewing images from an image source.

I claim:

1. An in-line system for viewing at a viewing location an image provided from an image source, comprising a retro-reflector, a beamsplitter, and a lens;

said retro-reflector, beamsplitter and lens being relatively positioned along a substantially straight line axis, and the viewing location also being on the axis, said lens and said beamsplitter being cooperative to form relative to said retro-reflector an enlarged image of the image provided from an image source, and said retro-reflector reflects light to said beamsplitter for transmission therethrough for viewing.

2. An eyepiece, comprising a retro-reflector a beamsplitter, and means for expanding an image received from a source, said retro-reflector, beamsplitter and means for expanding being relatively positioned along a substantially straight line axis, said beamsplitter and means for expanding being cooperative to direct an expanded image to said retro-reflector, and said retro-reflector and beamsplitter being cooperative to permit viewing of the expanded image.

3. An in-line viewing system for viewing at a viewing location an image from an image source, comprising a lens for directing an image from the image source toward the viewing location, a retro-reflector, and a beamsplitter between the lens and viewing location for reflecting light from the lens to the retro-reflector and for transmitting light from the retro-reflector to the viewing location, and said lens, retro-reflector, and beamsplitter being relatively positioned along a substantially straight line axis, and the viewing location also being on the axis.

4. A display system, comprising a retro-reflector and a beamsplitter in optical series, and focusing means for enlarging an image and directing the image toward the beamsplitter for reflection by the beamsplitter toward the retro-reflector, the retro-reflector being operative to reflect light toward the beamsplitter for transmission through the beamsplitter for viewing the enlarged image from a viewing location, and said retro-reflector, beamsplitter and focusing means being relatively positioned along a substantially straight line axis, and the viewing location also being an the axis.

5. A computer display system, comprising a computer for generating signals representing an image, a miniature display for presenting a light output representing such image, a retro-reflector, a beamsplitter, and focusing means for focusing light from the display to expand such image, said focusing means, beamsplitter and retro-reflector being in optical series along a substantially straight line axis, said beamsplitter being positioned to receive from said focusing means light expanding such image and to direct such light to the retro-reflector, and said retro-reflector reflects such light along substantially the same, but opposite, direction as the light incident thereon for transmission through said beamsplitter for viewing.

6. A private viewing system for viewing a display, comprising a retro-reflector, a beamsplitter, and a lens, said retro-reflector, beamsplitter and lens being positioned in a substantially optically straight path for presenting for viewing at a viewing location an enlarged image of the image provided by a display, said lens focuses light from a display toward the beamsplitter for reflection by the beamsplitter toward the retro-reflector while the image is enlarging, and said retro-reflector reflects light incident thereon for transmission through said beamsplitter for viewing at a viewing location.

7. A viewing apparatus, comprising a beamsplitter and a retro-reflector in optical series and in parallel spaced apart relation, and a lens on one side of said beamsplitter for enlarging an image from a source and directing the light representing the image toward said beamsplitter for reflection to said retro-reflector, and said retro-reflector reflects light incident thereon toward said beamsplitter for transmission to a viewing location for viewing of the enlarged image.

8. A display system, comprising a display for presenting a light output representing characteristics of an image, a lens for receiving such light output and for focusing the light to enlarge the image, a retro-reflector, and a beamsplitter, said lens, retro-reflector and beamsplitter being cooperatively related for the lens to direct light therefrom toward the beamsplitter for reflection thereby to said retro-reflector to form an enlarged image, and said retro-reflector reflects light incident thereon for transmission through said beamsplitter for viewing the enlarged image at a viewing location, and said retro-reflector beamsplitter and lens being relatively positioned along a substantially straight line axis and the viewing location also being on the axis.

9. A method for presenting an enlarged view of an image represented by light from an image source, comprising directing light along a substantially straight line axis from the image source toward a retro-reflector, said directing including expanding the light to form an enlarged image, said directing also including using a beamsplitter to reflect light from the image source toward the retro-reflector, and reflecting light by the retro-reflector substantially along the straight line axis to the beamsplitter for transmission through the beamsplitter for viewing of the enlarged image at a viewing location.

* * * * *